3,490,885
MANUFACTURE OF CHEMICALLY-STRENGTHENED GLASS ARTICLES

Friedrich W. Hammer, Toledo, Ohio, assignor to Owens-Illinois, Inc., a corporation of Ohio
No Drawing. Filed Dec. 30, 1966, Ser. No. 605,990
Int. Cl. C03c 17/22
U.S. Cl. 65—30    3 Claims

ABSTRACT OF THE DISCLOSURE

Process for adding lithium-containing material to a glass, by introducing the material into the glass in the forehearth of a melting furnace, just before the molten glass is gobbed out, so that a different glass composition is provided, making a shaped article from the glass and then ion exchanging the article to substitute sodium ions in the place of the lithium ions and provide a compressive stress surface layer so that the article has a higher flexural strength.

---

This invention relates to a modification of the manufacture from soda-lime-silica glass or soda-lime and/or magnesia-alumina-silica glass of articles, such as glass containers, tumblers, and sheet and plate glass, especially containers and other articles that are also made by forming a gob of glass to the desired shape. This modified manufacture results in an article having a greater flexural strength.

In the conventional manufacture of or process of making such articles, a base soda-lime-silica glass is made by melting and fining a conventional glass batch in a tank or furnace of large capacity. In the manufacture by formation from gobs of glass the molten glass flows from the furnace through a number of forehearths to a corresponding number of gob feeders, each having an orifice out of which the glass flows with periodic acceleration by means of a plunger and subsequent shearing of the issuing glass to provide periodically gobs of glass.

The present process differs from the conventional process by (1) the addition of lithium-containing material either to the batch or preferably to the molten glass flowing through the forehearth to provide a different glass composition or (2) the addition of sodium-containing material to the molten glass flowing through the forehearth to provide a glass with a higher $Na_2O$ concentration. The process also includes an ion-exchange treatment of the shaped article to substitute either sodium ions for lithium ions or potassium ions for sodium ions to provide a compressive stress surface layer so that the article has a higher flexural strength than the glass from unmodified batch or from the base glass without any forehearth addition as a similar article after an ion-exchange treatment for the same time and temperature to substitute potassium for sodium ions.

The base glass used in the process of the present invention is a glass that has a suitable relationship between its liquidus temperature and its log 4 viscosity temperature so that it can be used in a conventional process for such articles, especially in processes using automatic forming machines.

Suitable glasses that are well known and are widely used for the conventional manufacture of containers and such other articles mentioned above are soda-lime-silica glasses, sometimes merely called soda-lime glasses. E. B. Shand on page 4 in his book "Glass Engineering Handbook," 2nd Edition, McGraw-Hill Book Co., Inc., New York, N.Y., presents approximate compositions of commercial glasses including four glasses designated soda-lime glass along with a specific designation relating to the type of product.

In the preferred embodiment of the process of the present invention the base glass, that is one from among those suitable glasses mentioned above, and that is useful for gob feeding, is changed in composition by the addition in the forehearth of a material containing a substantial concentration of lithium. The amount of this lithium-containing material is limited so that the resultant glass has the proper viscosity-temperature relationship for the gob feeding and forming of the article from the gob by an automatic forming machine.

In the present manufacture or process the glass, obtained by addition of such lithium-containing material to the batch fed to the furnace or to the molten glass flowing through the forehearth, when the process uses a forehearth, contains on a weight basis from about 1% to about 5% $Li_2O$, preferably between about 2% and about 3% $Li_2O$. Of course, when the glass article manufacture uses forehearths and gob feeders, such addition of the lithium-containing material may be, by mixing with the conventional batch ingredients, fed to the glass furnace, but forehearth addition is preferred for the reasons stated below.

In the present process from such lithia-containing soda-lime-silica glass articles of manufacture are made as in the usual manner with normal soda-lime silica glass. The process is used especially to make from gobs of the glass, that are obtained from the furnace via a forehearth and a gob feeder, articles using conventional automatic machinery to press form or to mold using either the press-and-blow technique or the blow-and-blow technique. In the manufacture of other articles, glass is flowed from the furnace to make glass tubing and rods, plate glass, sheet glass, float glass and glass for electric lamp bulbs using conventional equipment.

In the present process such articles are then treated by contacting the surface of the article with a sodium-containing ion-exchange medium at an elevated temperature and for a period of time sufficient to substitute sodium ions for lithium ions in a surface layer of the glass article to provide a compressive stress surface layer. The elevated temperature is at least about 200° C. (about 400° F.) and is preferably greater than about 350° C. (about 650° F.). The maximum temperature of this ion-exchange treatment is a temperature less than the annealing point of the glass, preferably less than the strain point of the glass. The time of the ion-exchange treatment is dependent upon the temperature used and the depth of the ion-exchange to be accomplished. For a given depth of ion-exchange the time varies inversely with the temperature; thus the time can vary substantially, e.g., between 5 minutes and 24 hours.

Of course, as is now well known in the general field of ion exchange, the depth of ion exchange is limited, dependent upon the rate of such exchange. Diffusion of the introduced sodium too deeply can result in the loss of part or all of such compressive stress.

After the ion-exchange treatment, the article by the present process is cooled to room temperature. Any adhering ion-exchange medium is removed from the article, such as by washing.

The article resulting from the process of the invention, as described above, has a substantially higher flexural strength than the glass article before the ion-exchange treatment and has a substantially higher flexural strength than can be obtained by the ion-exchange treatment under the same conditions of time and temperature using a potassium-containing ion-exchange medium to treat such article made from a glass having the same composition, except for the modification due to the presence of $Li_2O$, i.e., free of $Li_2O$.

It is an object of this invention to provide a process that uses soda-lime-silica glass of modified composition to make articles of glass using conventional equipment with a particular subsequent ion-exchange treatment to produce an article having a higher flexural strength than obtainable with unmodified glass of such type and using a necessarily different ion-exchange medium.

It is another object of the present invention to provide a process that utilizes glass that is normal soda-lime-silica glass or a recently-developed substitute soda-lime and/or magnesia-alumina-silica glass or any intermediate glass composition to form, through the use of one or more forehearths receiving such glass from a furnace and through the use of associated gob feeding and molding equipment, conventional or normal articles such as containers, while at the same time utilizing one or more other forehearths connected to the same furnace to modify the glass composition and then making such articles by its similar molding equipment with subsequent ion-exchange treatment for the manufacture of articles that have higher flexural strength.

These and other objects of the invention will be apparent to one of ordinary skill in the art from the foregoing general description of the process when taken in conjunction with the more detailed description that follows and that includes examples of preferred embodiments of the present process.

The process of the invention uses a base glass, e.g., which is of the soda-lime-silica type. As mentioned earlier, this base glass is modified either after manufacture in a furnace or before manufacture by modification of the batch to be fed to the furnace. The composition of this base glass, i.e., the glass without the modification of added $Li_2O$ content, comprises essentially $SiO_2$, $Na_2O$, $CaO$ and $Al_2O_3$.

Such base glass for the manufacture of glass containers contains on a weight basis between 0.1% and 10% $Al_2O_3$. A minor percent of $Al_2O_3$ is present in such commercial glass as a result of its presence as an impurity in certain sands that are used to make such glass. For example, some commercial glass for container manufacture has as much as 9.5% $Al_2O_3$ by weight of the glass because of the high alumina content of the sand of the batch. In the manufacture of glass containers using sand having a very low alumina content as an impurity, the glass is made with the incorporation of additional alumina in the form of soda feldspar in the batch so that the glass will contain several percent of alumina to decrease the rate of devitrification and to provide improved durability to the soda-lime-silica glass.

There also may be present in such base glass small amounts of potassia ($K_2O$) and magnesia ($MgO$). The latter is introduced usually in the glass by its presence in some calcium-containing material, such as dolomite and dolometic lime, that are used to provide a $CaO$ content to the glass.

The following are ranges on a weight percent basis for the various ingredients of oxides that are essential or optional additional ingredients in the base glass utilized in this process:

Ingredients: Ranges
 $SiO_2$ _____ 43–75
 $Al_2O_3$ _____ 0.1–25
 $CaO$ _____ 5–30
 $MgO$ _____ 0–15
 Total $CaO$ and $MgO$, expressed as $CaO$ _____ 8–30
 $Na_2O$ _____ 3.5–20
 $K_2O$ _____ 0–5
 Total $Na_2O$ and $K_2O$, expressed as $Na_2O$ ___ 5–20
 $BaO$ _____ 0–5
 $B_2O_3$ _____ 0–5

In that aspect of the present process, in which a base soda-lime-silica glass is made in a furnace and a lithium-containing material is added to the glass flowing through a forehearth to modify the glass fed to a gob feeder, the base glass has a composition based on the following ingredients in the indicated ranges and preferred ranges on a weight percent basis:

| Ingredient | Range | Preferred range |
|---|---|---|
| $SiO_2$ | 70–75 | 70–75 |
| $Al_2O_3$ | 0.1–10 | 0.1–3 |
| $CaO$ | 6–12 | 7–12 |
| $MgO$ | 0–6 | 2–5 |
| Total $CaO$ and $MgO$, expressed as $CaO$ | 8–18 | 10–16 |
| $Na_2O$ | 10–20 | 10–15 |
| $K_2O$ | 0–5 | 0–1 |
| Total $Na_2O$ and $K_2O$, expressed as $Na_2O$ | 10–20 | 10–16 |

In the foregoing tabulation of the base glass composition, the $BaO$ and $B_2O_3$ contents, if any, would be a maximum of about 5% by weight of the base glass for each, and preferably a maximum of about 1% and 2%, respectively, by weight of the base glass.

The addition of the lithium-containing material to the glass flowing through the forehearth in this aspect of the one embodiment of the present process is accomplished by using with the forehearth colorant-frit addition equipment e.g., the apparatus disclosed in U.S. Patent No. 3,057,175. Also the mixing of the added lithium-containing material into the base glass flowing through the forehearth to provide a homogeneous modified glass is provided, for example, the mixing apparatus disclosed in that U.S. patent.

In this aspect of the present process the lithium-containing material must be not only compatible with the base glass but also have a sufficiently high concentration of lithium to provide in the mixture with the base glass an $Li_2O$ content within the range specified above for the modified glass without adding deleterious material to the glass. Suitable lithium-containing materials are $Li_2O$ and a lithia-silica binary glass that has a liquidus temperature below that of the glass flowing through the forehearth, for example, lithium silicate containing about 42% by weight of $Li_2O$ and about 58% by weight of $SiO_2$. This lithium silicate has a melting point of about 1100° C. (about 2012° F.).

The lithium-containing material is added to the base glass flowing through the forehearth in a ratio that depends upon the lithium content of the added material and the desired percent of $Li_2O$ to be in the modified glass. When the added lithium-containing compound is $Li_2O$, obviously the ratio of added $Li_2O$ to the base glass is only slightly higher than the ratio of $Li_2O$ to the entire glass composition because the added material is 100% $Li_2O$. However, in the case of lithium silicate the ratio of added material to the base glass is much higher. For example, when molten lithium silicate, of the composition mentioned above and at approximately the temperature of the glass to which it is added, is fed at the rate of 5 pounds per 100 pounds of glass, this changes the composition of a typical base glass as follows ignoring minor ingredients:

| Ingredients | Base Glass, percent | Added, percent | Recalculated, percent |
|---|---|---|---|
| $SiO_2$ | 73.8 | 76.7 | 73.1 |
| $Al_2O_3$ | 2.2 | 2.2 | 2.1 |
| $MgO$ | 3.9 | 3.9 | 3.7 |
| $Li_2O$ | | 2.1 | 2.0 |
| $Na_2O$ | 10.1 | 10.1 | 9.6 |
| $CaO$ | 9.7 | 9.7 | 9.2 |
| $K_2O$ | 0.3 | 0.3 | 0.3 |
| Total | 100 | 105 | 100 |

The base glass had a liquidus temperature of 1990° F. and a log 4 viscosity temperature of 2000° F. whereas the corresponding temperatures of the modified glass are about 1800° F. and about 1755° F.

When $Li_2O$ is added at the rate of 2 lbs. per 98 lbs. of this base glass to provide a modified glass containing 2.0% by weight of $Li_2O$, the other ingredients, on a weight basis, are: 72.3% $SiO_2$, 2.2% $Al_2O_3$, 3.8% $MgO$, 9.9%

Na₂O, 9.5% CaO and 0.3% K₂O. This modified glass has a liquidus temperature of about 1875° F. and a log 4 viscosity temperature of about 1740° F.

In the present process this glass article having the composition as regards $Li_2O$ content but otherwise on a molar basis essentially corresponding to the base glass is chemically strengthened by ion exchange of lithium ions. Thus there is not merely forehearth addition to modify the glass composition as in the case in forehearth colorant frit addition. There is a treatment of the article. The frit merely provides colorant into the glass so that the article will have the desired color and CIE colorimetric values. In the present process this forehearth addition cooperates with the subsequent ion exchange to provide a stronger glass article than had been obtainable either without the addition or with the addition but without the ion-exchange treatment.

Furthermore, this aspect of the present process has the advantage of producing chemically-strengthened glass articles from glass made in a furnace without converting the entire production of the glass in the furnace to this modified formulation. As a result other forehearth and associated gob feeders can use the normal base glass to make conventional containers or other articles from gobs of such glass without any change of present conditions of temperature, rate of gob feeding, etc., for normal production. Also, the regular production of containers are made without any increased cost that would be attributable to the use of the lithium-containing material, because it is only added to those containers where the product can be sold at a higher price required by the cost of such addition and the ion exchange treatment. Furthermore, this aspect of the present process permits variations in the amount of incorporation in the amount of lithia content in the modified glass, so different degrees of increase in strength by the ion-exchange part of the process can be provided to container by a rapid changeover in the modified composition. This is possible in view of the fact that the only change is being made in the glass downstream of the glass furnace by being made in an individual forehearth. Thus this process can then permit such modification of the base glass in all of the forehearths but by a different amount when the forehearths are being used to provide glass for the manufacture of different containers that have different requirements of desirable strength increase to be afforded with such modification in combination with such ion-exchange treatment. This ready changeability in the degree of modification of the glass also permits the utilization of a standard temperature and time of the ion-exchange treatment to provide containers having the different degrees of strengthening by a change in $Li_2O$ content. Such is the case even for the same type of containers that are made for customers who differ in their desire for increased strength.

In view of the advantages, expressed above, with regard to this aspect of the embodiment of the process that utilizes forehearth addition of lithium-containing material to modify this soda-lime-silica glass, such advantages ae similarly utilized in the second embodiment of the process. In that embodiment a sodium-containing material is added to the base glass flowing through the forehearth. In this second embodiment of the present process the added sodium-containing material is, for example, $Na_2O$ or a sodium silicate composition or glass that has a liquidus temperature that is also preferably no higher than the temperature of the base glass at the place where the sodium silicate is added to the base glass. As in the case of $Li_2O$ addition, the $NaO_2$ added is preferably at an elevated temperature to minimize the change in temperature of the glass flowing through the forehearth.

In this second embodiment of the present process, the additional $Na_2O$ content results in a greater rate of ion exchange and thus greater strength of the article, when the article to be obtained is treated with a potassium-containing material, than that obtained by the same ion-exchange treatment of an article of the base glass. Of course, this is the case when the same time and temperature of ion-exchange treatment are used for the modified glass and the base glass and these conditions preferably are not such as to permit the maximum strengthening of the base glass.

In this embodiment the base glass that is fed to the forehearth has a composition with the following ranges and preferred ranges of various ingredients that either are essential or are partial alternatives on an approximate weight percent basis:

| Ingredient | Range | Preferred range |
|---|---|---|
| $SiO_2$ | 70–75 | 70–75 |
| $Al_2O_3$ | 0.1–10 | 0.1–3 |
| CaO | 6–12 | 7–12 |
| MgO | 0–6 | 2–5 |
| CaO+MgO, expressed as CaO | 8–18 | 10–16 |
| $Na_2O$ | 10–15 | 10–13 |
| $K_2O$ | 0–5 | 0–1 |
| $Na_2O+K_2O$, expressed as $Na_2O$ | 10–16 | 10–13 |

Of course, such base glass can contain BaO or $B_2O_3$ or both in the amounts indicated above.

In this embodiment the ion-exchange treatment, that is part of the process, uses a potassium-containing medium, e.g., a potassium salt, at an elevated temperature and for a period of time that are sufficient to provide an article with a compressive stress surface layer. As in the other embodiment of the process in which sodium is exchanged for lithium in the glass, the limitation regarding maximum temperature is applicable.

Although the formula weight of $Na_2O$ is slightly more than double that of $Li_2O$, it is not necessary in the $Na_2O$ addition to the base glass that at least 2% by weight of $Na_2O$ be incorporated. This is because the base glass already contains a substantial $Na_2O$ content. Accordingly, in this second embodiment of the present process, the sodium-containing material is added to the base glass to incorporate an additional amount of $Na_2O$ that constitutes at least 1% by weight of the modified glass. The maximum amount of additional $Na_2O$ content is dependent upon the overall composition of the base glass of the Grubb et al. type. It is about 6.5%, which is when the original $Na_2O$ content of the base glass is 3.5% by weight.

In view of the foregoing detailed description of the present invention it is apparent that the incorporation of additional $Na_2O$ as sodium-containing material in the batch mixture to be fed to a glass furnace is not presented as part of the invention whereas such incorporation of $Na_2O$ by forehearth addition is described as one of the embodiments of the process of the invention. The main reason for the exclusion of the additional incorporation of $Na_2O$ content in the batch mixture is the difficulty of delineating the compositions that result vis-a-vis the actual compositions that have been utilized in the past. This is not to say that these compositions resulting from such incorporation are the same as those heretofore used, but rather the resultant glasses are within broad ranges of oxides in the compositions tabulated in the prior art publications for soda-lime-silica glasses. Such tabulations indicate $Na_2O$ concentrations as high as 20% by weight of the glass. Of course, actual glass compositions, on which such tabulations are based, contain a high concentration of CaO and relative low concentration of or no MgO.

Moreover, as seen below in one of the examples the advantage of such particular novel glasses resulting from $Na_2O$ incorporation in the batch are of lesser importance, because the incorporation of $Li_2O$ instead of the supplemental or additional incorporation of $Na_2O$ provides, with the subsequent ion exchange, considerably superior articles from the standpoint of flexural strength. Of course, this advantage of $Li_2O$ incorporation is attained regardless of whether such incorporation is in the batch fed to the furnace or is by forehearth addition. However, there are advantages, as described above, in the use of forehearth addition for the incorporation of $Li_2O$ content in the glass as compared with such incorporation of $Li_2O$ by addition of lithium-containing material to the batch mixture fed to the furance. These advantages of the use of forehearth addition in combination with the ion exchange of the formed article are realized by the addition of $Na_2O$ through forehearth addition and such, therefore, is part of the present process as the second embodiment of the process of the present invention. This second embodiment presents no difficulty in delineating over prior glasses because such glasses can result from the forehearth addition that, in combination with the ion-exchange treatment of the formed article, presents the process distinction over the prior art.

The following examples of the change in glass composition that can result by forehearth addition or batch modification illustrate the increased flexural strength of an article of the modified glass. These examples do not use forehearth addition. Such is unnecessary to illustrate the present invention because the manner of using forehearth addition is adequately described in the prior art including the U.S. patents mentioned above. Preferably such addition utilizes the additive, preferably at a temperature approximating that of the glass flowing through the forehearth at the location where such addition is accomplished. This is the same as in the case of colorant frit addition to the forehearth.

EXAMPLE I

Two glasses, designated glass No. 1 and Glass No. 2, were made in the form of rods from canes as follows:

A mixture of the following batch materials was melted in a platinum crucible within a gas-fired furnace using slightly oxidizing conditions with a maximum temperature of about 2900° F. and sufficient time for melting and refining to provide a homogeneous glass. The conventional mechanical stirring was used until fining of the glass was obtained.

For glass No. 1 the mixture used was as follows:

| Batch materials: | Parts by weight |
|---|---|
| Ottawa flint [1] | 3,701.3 |
| Alcoa A–10 alumina [2] | 110.1 |
| Periclase [3] | 199.4 |
| Soda ash | 870.7 |
| Calcium carbonate | 862.8 |
| Potassium carbonate | 22.0 |

For glass No. 2 the mixture used was as follows and the glass was made as described above for glass No. 1:

| Batch materials: | Parts by weight |
|---|---|
| Raw dolomite [4] | 892.1 |
| Ottawa flint [1] | 3,355.8 |
| Spodumene [5] | 408.4 |
| Lithium carbonate | 176.1 |
| Soda ash | 853.4 |
| High-calcite Mississippi limestone [6] | 365.7 |
| Potassium carbonate | 24.2 |

The typical compositions of batch material designated by superscript numbers are as follows on a weight basis:

(1) 99.9+% $SiO_2$.
(2) 99.5% $Al_2O_3$, 0.03% $Fe_2O_3$, 0.1% $Na_2O$, 0.08% $SiO_2$, 0.2% ignition loss at 900° C.
(3) 95.3% MgO, 0.5% $Fe_2O_3$, 2.8% $SiO_2$, 0.3% $Al_2O_3$, 1.1% CaO.
(4) 30.4% CaO, 21.5% MgO, 0.5% $SiO_2$, 0.1% $Al_2O_3$, 0.072% $Fe_2O_3$, 0.023% $P_2O_5$, 0.04% $SO_3$, and the rest is $CO_2$ of the carbonate.
(5) 63.4% $SiO_2$, 26.2% $Al_2O_3$, 7.4% $Li_2O$, 1.0% $Na_2O$, 0.7% $K_2O$, 0.7% iron oxide expressed as $Fe_2O_3$, 0.2% Mn expressed as MnO, 0.5% combined CaO and MgO, and 0.3% ignition loss at 1000° C.
(6) 55.3% CaO, 0.4% MgO, 0.4% $SiO_2$, 0.04% $Al_2O_3$, 0.046% $Fe_2O_3$, 0.03% $SO_3$, 0.008% $P_2O_5$, 0.004% $Cr_2O_3$ and the rest is $CO_2$ as carbonate.

Each glass was cooled to a suitable temperature at which it has the desired viscosity to draw or pull a number of canes. Glasses Nos. 1 and 2 of these canes had the following theoretical compositions on a weight basis, calculated from the composition of the batch materials, assuming no loss of ingredients and ignoring minor impurities:

| Ingredient | Glass No. 1, percent | Glass No. 2, percent |
|---|---|---|
| $SiO_2$ | 73.8 | 72.3 |
| $Al_2O_3$ | 2.2 | 2.2 |
| MgO | 3.9 | 3.8 |
| $Li_2O$ | | 2.0 |
| $Na_2O$ | 10.1 | .99 |
| CaO | 9.7 | 9.5 |
| $K_2O$ | 0.3 | 0.3 |

Glass No. 1 had a liquidus temperature of 1990° F., a log 4 viscosity of 2000° F., i.e., a viscosity of $10^4$ poises at that temperature, and an annealing point of 1030° F. Glass No. 2 had a liquidus temperature of 1875° F. and a log 4 viscosity of 1740° F.

The drawn cane of each of these two glasses was cooled slowly to room temperature. After their annealing the sample canes, having an average diameter of 0.200±0.005 inch, were cut into 5-inch lengths to make sample rods.

The unabraded flexural strength of glass No. 1 was determined using some of the sample rods. Other sample rods of glass No. 1 were severely abraded by tumbling for 15 minutes in a ball mill containing No. 30 silicon carbide grit. These abraded rods were tested for their flexural strength. The average flexural strength or modulu of rupture for the unbraded glass No. 1 was 19,000 p.s.i. while the average value for the abraded glass No. 1 was 14,000 p.s.i.

Other sample rods of glass No. 1 were preheated to about 750° F. and then immersed in a molten bath of potassium nitrate for 4 hours at about 750° F. (about 400° C.). The rods were removed from the molten bath and to avoid thermal tempering were cooled freely in air to room temperature. The cooled rods, after washing with water to remove an adherent coating of potassium nitrate, were dried. Some of these ion-exchanged rods were severely abraded, as described above, for untreated rods. The unabraded and the abraded ion-exchanged rods were tested for their flexural strength. The average values of unabraded and abraded flexural strength were 22,000 p.s.i. and 12,000 p.s.i., respectively. An examination of a 0.01-inch thick disc cut from an ion-exchanged rod of glass No. 1 revealed a compressive stress surface layer depth of 3 microns and an optical retardation of 56 millimicrons per 0.01-inch. The optical retardation value can be converted to approximate corresponding compressive stress by multiplying the optical retardation value by 250 to obtain compressive stress in p.s.i.

Other sample rods of glass No. 1 were preheated to about 750° F. and then subjected to an ion-exchange treatment under the same conditions as described above but using a molten bath of sodium nitrate instead of potassium nitrate. Some of these treated rods were severely abraded as described above. Average values of modulus of rupture or flexural strength of unabraded and abraded ion-exchanged rods were 11,000 p.s.i. and 8,000 p.s.i., respectively. Examination of a disc from another treated sample rod failed to show any compressive stress surface layer and there was no optical retardation.

Sample rods of glass No. 2 were treated as described above for glass No. 1 with sodium nitrate. Some were tested for flexural strength without abrasion and others were tested after the severe abrasion described above.

These treated rods of glass No. 2 had an average value of unabraded and abraded flexural strengths of 43,000 p.s.i. and 15,000 p.s.i., respectively. Examination of a disc from another ion-exchanged rod of glass No. 2 showed a compressive stress surface layer depth of 22 microns and an optical retardation of 50 millimicrons per 0.01 inch.

In the case of earlier studies of others on the ion-exchange treatment of other glasses to improve their flexural strength, it has been determined that such severe abrasion using No. 30 silicon carbide grit will substantially reduce or eliminate the increase of flexural strength afforded by ion exchange unless the compressive stress surface layer created by the ion-exchange treatment has a depth of at least 50 microns.

EXAMPLE II

Two other glasses, designated Nos. 3 and 4, were made as described above in Example I but using the following mixtures of batch materials:

| Batch Materials | Parts by weight | |
|---|---|---|
| | Glass No. 3 | Glass No. 4 |
| Petalite [7] | | 3,496.5 |
| Ottawa flint [1] | 2,871.0 | 81.1 |
| Periclase [3] | 434.6 | 419.2 |
| Alcoa A-10 alumina [2] | 803.5 | 210.3 |
| Soda ash | 482.8 | 436.0 |
| Calcium carbonate | 1,073.4 | 1,046.8 |
| Potassium carbonate | 36.6 | 20.9 |

The superscripts refer to the same batch materials as in Example I except for item (7) which is commercial petalite that on a weight percent basis contains: 77.7% $SiO_2$, 16.2% $Al_2O_3$, 4.2% $Li_2O$, 0.4% $Na_2O$, 0.2% $K_2O$, 0.03% iron oxide expressed as $Fe_2O_3$, an ignition loss of 1% and trace impurities.

These glasses had the following compositions expressed as oxides on a weight basis and assuming no loss of ingredients while ignoring minor impurities:

| Ingredient | Glass No. 3 | Glass No. 4 |
|---|---|---|
| $SiO_2$ | 57.3 | 55.6 |
| $Al_2O_3$ | 16.0 | 15.5 |
| MgO | 8.5 | 8.2 |
| $Li_2O$ | | 3.0 |
| $Na_2O$ | 5.6 | 5.4 |
| CaO | 12.1 | 11.8 |
| $K_2O$ | 0.5 | 0.5 |

These glasses had liquidus temperatures of 2135° F. and 2140° F., respectively, and log 4 viscosities of 2000° F. and 1700° F., respectively.

Strength determinations were made on some of the sample rods of glass No. 3 without and after the severe abrasion described in Example I. These values were 17,000 p.s.i. and 12,000 p.s.i., respectively.

The average values of modulus of rupture of other sample rods of glass No. 3 and some rods of glass No. 4 were determined after the 4-hour treatment in molten potassium nitrate at 750° F., as described above without and after the severe abrasion, as described above. In the case of glass No. 3, the average unabraded and abraded flexural strengths after the potassium nitrate treatment were 18,000 p.s.i. and 14,000 p.s.i., respectively, whereas glass No. 4 after such potassium nitrate treatment the abraded and unabraded modulus of rupture values were 13,000 p.s.i. and 19,000 p.s.i., respectively. A disc from a sample rod of glass No. 3 after the potassium nitrate treatment showed no compressive stress surface layer and no optical retardation, whereas a disc from a sample rod of glass No. 4 after such potassium nitrate treatment had a depth of such layer of 12 microns and an optical retardation of 35 millimicrons per 0.01 inch.

The similar treatment of other sample rods of glasses Nos. 3 and 4, but using sodium nitrate instead of potassium nitrate, provided average values of unabraded and abraded flexural strength of 18,000 p.s.i. and 12,000 p.s.i., respectively, for glass No. 3 and 92,500 p.s.i. and 16,900 p.s.i., respectively, for glass No. 4. Glass No. 3 after the sodium nitrate treatment had no compressive stress surface layer and no optical retardation, whereas the treated glass No. 4 had a depth of such compressive stress surface layer of 33 microns and an optical retardation of 120 millimicrons per 0.01 inch.

In Examples I and II, $Li_2O$ or a suitable lithium silicate glass, for example, a glass containing 42% by weight of $Li_2O$ and 58% by weight of $SiO_2$, was not added to the batch to make glasses Nos. 2 and 4.

Such lithium-containing materials are some of the suitable materials when $Li_2O$ content is incorporated by forehearth addition to the glass. Although those materials, that are suitable for forehearth addition, can be used to modify a batch to incorporate $Li_2O$ content, other lithium-containing materials, that are not desirable or suitable for forehearth addition, alone or with other lithium-containing material, can be used to modify the batch used to make glass. Some lithium-containing materials are not desirable, at least alone, for forehearth addition because of the low lithium content in the material or because of the undesirable release of gas, e.g., the release of $CO_2$ when lithium carbonate is used, in the glass in the forehearth, but can be used in the batch sometimes with modification of amounts of usual ingredients to make the base glass or partial or complete substitution of any or more of such ingredients by other conventional ingredients to impart the usual oxides in their proper concentrations.

Because the $Li_2O$ content was provided by the incorporation in the batch by the use of spodumene and lithium carbonate for glass No. 2 and by the use of petalite in the batch for glass No. 4 rather than lithium carbonate alone, appropriate modifications of the materials used to make the batches for glasses Nos. 1 and 3 were made.

The batch for glass No. 2 differed from the batch for glass No. 1 by the use of raw dolomite and high-calcite Mississippi limestone merely as alternatives for calcium carbonate and periclase to provide the same concentrations based on the base glass of MgO and CaO. Batch modification was required to eliminate the use of Alcoa A-10 alumina and reduce the percentage of Ottawa flint, because spodumene contains $Al_2O_3$ and silica as well as the $Li_2O$ content being incorporated. To avoid too much $Al_2O_3$, part of the $Li_2O$ content was incorporated as lithium carbonate rather than a larger amount of spodumene. However, periclase, calcium carbonate, Ottawa flint and Alcoa alumina in the same proportions as in glass No. 1 could have been used in making glass No. 2 with the use of lithium carbonate along to provide the $Li_2O$ content.

Of course, in the preferred aspect of the first embodiment of the process of the invention the incorporation of lithia into the glass at the forehearth would utilize a suitable lithium-containing material, as mentioned above. In that aspect spodumene would not be suitable, at least to provide $Li_2O$ content in the high part of its range in the modified glass, because of its relatively low $Li_2O$ content of only 7.4% by weight of spodumene and its relatively high $Al_2O_3$ content and low content of CaO and MgO. Similarly lithium carbonate would not be desirable for use alone for forehearth addition because of $CO_2$ gas evolution that would be undesirable; however, some of the additive could be lithium carbonate.

A study of the data on flexural strength appearing in Example I shows clearly the very superior flexural strength of Glass No. 2, obtained by the incorporation of the $Li_2O$ content with subsequent exchange of lithium ions in the surface layer of the glass article by sodium ions, instead of using an ion exchange of potassium for sodium ions in the unmodified glass (glass No. 1). The treatment of unmodified glass with sodium nitrate actually had a deleterious affect on the flexural strength either without or after abrasion.

A study of the strength data presented above for Example II shows that an even higher flexural strength can be obtained by the use of the $Li_2O$ incorporation to make glass No. 4 by a modification of Glass No. 3 with subsequent exchange of sodium ions for lithium ions. The treatment with sodium nitrate of unmodified glass (glass No. 3) provided no real change in flexural strength and the same is true for the potassium nitrate treatment of the unmodified glass. The latter result can be explained on the basis of the small (5.6%) $Na_2O$ content in the glass, even though such glass contained 16% $Al_2O_3$.

There was a compressive stress surface layer formed when the $Li_2O$-modified glass (glass No. 4) was treated with potassium nitrate and the depth of the layer was 12 microns, but this exchange may have been potassium for sodium or for lithium or for both. In any event increase in strength is practically zero.

In view of the treatment for ion exchange for only 4 hours and at 750° F., it is apparent that a higher temperature and/or longer period of time of treatment can provide for a greater depth of compressive stress surface layer so as to maintain the high flexural strengths to which the glasses Nos. 1 and 3 are increased by the incorporation of lithia to provide glasses Nos. 2 and 4, respectively. The decrease of strength by abrasion is to be expected in view of the severe abrasion that was used to determine abraded flexural strength. The minimum depth requirement for the surface layer has been expressed above as necessary to maintain an adequate compressive stress surface layer for the strength maintenance.

Referring to glass No. 1 in Example I, it is to be noted that $Al_2O_3$ content is only 2.2% by weight. The presence of 3.9% MgO and the presence especially of 9.7% CaO are also to be noted. The article by M. E. Nordberg et al., entitled "Strengthening by Ion Exchange" in vol. 47, of J. Am. Ceramic Society (May, 1964) at pages 215–219, teaches the undesirability of using more than 5% by weight of CaO in a glass composition because the flexural strength decreases as there is further increase in CaO content. FIGURE 2 of that article shows the increased strength obtained by increasing the $Al_2O_3$ content in the glass.

Others have studied glasses that are not soda-lime-silica glasses, to find glass that can be treated by ion-exchange medium to give a relatively high strength. For example, French Patent No. 1,389,169 describes the ion-exchange treatment of a special glass that contains soda-lithia-alumina-silica, but must also contain at least 2% by weight of zinc oxide. These glasses contain about 10% to about 30% by weight of $Al_2O_3$ and preferably at least 18% $Al_2O_3$. According to the patent, these glasses cannot tolerate more than 2% by weight of CaO. It is noteworthy that, even though such special glass contains soda and lithia, the ion exchange is potassium for one or both of the smaller alkali metal ions. Such ion-exchange medium does not give the increase in strength in the $Li_2O$-modified glass of the present invention, as evidenced by the data in Example I.

The unmodified glass of Example II, namely, glass No. 3, contains a high $Al_2O_3$ content (16%). However, such glass also contains a high CaO content (12.1%) as well as a somewhat lower MgO content (8.5%). The potassium nitrate treatment has no effect on such composition apparently in view of, at least, the high CaO content and the low $Na_2O$ content (5.6%), but surprisingly the incorporation to this base glass of sufficient $Li_2O$ content to provide only 3% by weight of $Li_2O$ can provide by the subsequent sodium-for-lithium ion exchange an unabraded flexural strength of 92,500 p.s.i. This was using a sodium nitrate treatment. It is also noteworthy that there is practically no increase in flexural strength obtained by a potassium nitrate treatment even though the total content of alkali metal ions smaller than potassium ions in the glass have been increased substantially by the lithia incorporation. $Li_2O$ as 3% by weight is, on a molar basis, the substitution of the equivalent of 6% by weight additional $Na_2O$. However, it is only this 3% by weight of $Li_2O$ as lithium ions that is partially substituted to produce this strength.

EXAMPLE III

This example essentially modifies a normal soda-lime-silica glass by a higher $Na_2O$ content through forehearth addition of a suitable sodium-containing material to the base glass and then by ion exchange of the article from such glass. Glasses Nos. 5 and 6 actually made from conventional batch materials differed in some respects from those used for glass No. 1 and used borax and barium-containing materials to impart BaO and $B_2O_3$. Both used soda ash. Nepheline syenite or feldspar provided part of the $Na_2O$ and $SiO_2$ contents and the $Al_2O_3$ content. However, the glass composition rather than batch materials is important and could be obtained in essence by additional soda ash in the batch for glass No. 1. BaO and $B_2O_3$ would be absent but they are not essential. Also the concentrations of $SiO_2$ etc. would differ but not essentially from those of glasses Nos. 5 and 6. Sample rods were obtained from these glasses having the following compositions based on weight, expressed as oxides, and ignoring impurities:

| Ingredient | Glass No. 5, Percent | Glass No. 6, Percent |
| --- | --- | --- |
| $SiO_2$ | 71.5 | 67.7 |
| $Al_2O_3$ | 2.2 | 2.8 |
| CaO | 5.7 | 5.6 |
| MgO | 3.0 | 4.0 |
| $Na_2O$ | 14.0 | 15.1 |
| $K_2O$ | 1.5 | 1.2 |
| BaO | 1.5 | 2.0 |
| $B_2O_3$ | | 1.5 |
| $Fe_2O_3$ | | 0.07 |

Glass No. 6 had an annealing point of 971° F.

Sample rods of glass No. 5 were treated by immersion in molten potassium nitrate for 1 hour at 400° C. with the sequence of steps being those described above for earlier examples. These treated rods had an average unabraded flexural strength of 27,500 p.s.i., a compressive stress surface layer that was 4 microns deep, an optical retardation of 90 millimicrons per 0.0 inch.

Rods of glass No. 5 similarly treated with potassium nitrate for 1 hour but at 450° C. had an average unabraded strength of 60,900 p.s.i. with only a depth of 7 microns for the compressive stress surface layer but an optical retardation of 140 millimicrons per 0.01 inch. As seen in FIG. 7 of the Nordberg et al. article for another glass, i.e. a soda-alumina-silica glass instead of soda-lime-silica glass, 1 hour at 500° C. is equal in the strength increase obtained by the ion exchange for 4 hours at 450° C. Thus, for glass No. 5 a 4-hour treatment at 400° C. would be expected to provide an unabraded strength of about 60,000 p.s.i. or at least about 50,000 p.s.i. Such strength is much greater than the 22,000 p.s.i. strength value obtained by treating glass No. 1 with the same ion-exchange medium for 4 hours at 750° F. and is attributable primarily to the higher $Na_2O$ content.

A comparison of the composition of glass No. 1 of Example I and glass No. 5 of this example shows the same $Al_2O_3$ content of 2.2% by weight, a somewhat lower MgO content for glass No. 5 (3.0% versus 3.9% of glass No. 1), a lower CaO content but still above 5% by weight (actually 5.7%) and a 2% difference in $SiO_2$ content. The lower $SiO_2$ content is partially attributable to the higher $Na_2O$ content (14% for glass No. 5 versus 10.1% for glass No. 1) and partially due to the presence in glass No. 5 of a higher $K_2O$ content (1.5% for glass No. 5 versus 0.3% for glass No. 1) and the presence of 1.5% by weight of BaO.

By the work of others on the ion-exchange treatment with sodium nitrate for 3 hours at 400° C. of glass-ceramics for exchanging sodium for lithium in the glass-ceramic, it was indicated that BaO when present had an adverse effect on the flexural strength of abrasion such that for an abraded strength of 50,000 p.s.i. and higher no BaO should be present. As much as 2.5% by weight of BaO could be present and yet the ion-exchanged glass-ceramic would have an abraded strength of 40,000 p.s.i. Even higher BaO content could be present for lower abraded strengths provided by the ion-exchange treatment. By analogy BaO content in glass No. 5 would contribute nothing to the glass composition as regards the increase of strength provided by the ion-exchange treatment with potassium nitrate.

In view of the fact that the potassium nitrate treatment is exchanging potassium ions for sodium ions in the glass, the higher $K_2O$ content, as compared with that of glass No. 1, would also contribute nothing to the increase in strength provided by the ion-exchange treatment.

Although the CaO content of glass No. 5 is lower that that in glass No. 1, this potassium nitrate treatment of glass No. 5 shows the enhanced degree of ion exchange obtainable by the use of the higher $Na_2O$ content when several factors are taken into consideration. Firstly, the ion-exchange treatment at 400° C. was for only 1 hour using glass No. 5 and yet the depth of the compressive stress surface layer was 4 microns versus only 3 microns for the 4-hour treatment of glass No. 1. Furthermore the unabraded flexural strength was 27,500 p.s.i. as compared with the lower value of 22,000 p.s.i. for glass No. 1 after its 4-hour treatment at the same temperature. Also the optical retardation of 90 millimicrons is nearly double that of the optical retardation of glass No. 1. According to Fick's law as described in the Nordberg et al. article mentioned above, the potassium nitrate treatment of glass No. 5 for 4 hours would be expected to provide the compressive stress surface layer depth of about 7 to 8 microns along with a further increase of unabraded flexural strength, such as mentioned above for the 1-hour treatment at 450° C.

Ten sample rods of glass No. 6 were treated with molten potassium nitrate for 16 hours at 750° F. using the series of steps for the treatment described in the earlier examples. As compared with glass No. 5 the potassium nitrate treatment at 750° F. (400° C.) was 4 times as long. According to Fick's law such longer treatment would be expected to provide for glass No. 1 a compressive stress surface layer depth of about 6 microns. In the case of the 16-hour treatment of glass No. 6 with potassium nitrate the compressive stress surface layer formed had a depth of 15 microns. The average unabraded flexural strength of these treated rods of glass No. 6 was 43,000 p.s.i. which is a higher modulus of rupture then would be expected by the longer treatment of glass No. 1 that had an unabraded flexural strength of 22,000 p.s.i. after the 4-hour treatment with potassium nitrate.

The treated glass No. 6 had a surface compressive stress of 10,000 p.s.i. whereas the optical retardation of treated glass No. 1 was 56 millimicrons per 0.01 inch calculated to such stress of 14,000 p.s.i. However, the longer time at the same temperature can result in some lowering of the maximum value but the very substantial depth difference far outweighs the maximum stress value as evidenced by the flexural strength values that are the decisive values.

The untreated glass No. 6 had an average unabraded flexural strength of 17,100 p.s.i.

A comparison of the difference in composition of glass Nos. 1 and 6 indicate that the enhanced increase in flexural strength obtained with glass No. 6 indicates that the main factor for the greater increase of flexural strength is the 15.1% $Na_2O$ in glass No. 6 instead of the lower $Na_2O$ content of 10.1% in glass No. 1.

EXAMPLE IV

This example illustrates the increase in flexural strength obtained by adding sodium-containing material to glass in a forehearth to increase its $Na_2O$ content, followed by potassium-for-sodium ion exchange of the article formed from the $Na_2O$-modified glass.

Sample rods of two glasses, designated glasses Nos. 7 and 8, were made from cane drawn from two glasses having the following compositions, on a weight basis expressed as oxides, with the values rounded off to the first decimal point and ignoring impurities. These glasses were made from a mixture of 10% dolomite lime and 90% Spruce Pine feldspar and a mixture of 10% dolomite and lime and 90% nephtheline syenite, respectively.

| Ingredient | Glass No. 7, Percent | Glass No. 8. Percent |
| --- | --- | --- |
| $SiO_2$ | 61.6 | 54.8 |
| $Al_2O_3$ | 17.4 | 21.3 |
| CaO | 7.0 | 6.1 |
| MgO | 3.6 | 4.1 |
| $Na_2O$ | 6.3 | 9.1 |
| $K_2O$ | 4.0 | 4.6 |
| $Fe_2O_3$ | 0.1 | 0.1 |

These glasses were made from the batch mixtures in platinum crucibles at a temperature of 2700° F. to 2800° F.

Sample rods of glasses Nos. 7 and 8 were treated with molten potassium nitrate, as described above in the Example II, but the temperature of the potassium nitrate was 1050° F. The rods of each glass were immersed for 15 minutes or for 1 hour. The treated rods were cut to provide discs for examination.

Glass No. 7, after the 1-hour treatment had a compressive stress surface layer of 40 microns, whereas treated glass No. 8 had a depth of 63 microns. The maximum compressive stress in the surface layer of these treated glass rods, as calculated from optical retardation values, was 16,000 p.s.i. and 28,000 p.s.i. for glasses Nos. 7 and 8, respectively. Examination of the disc after the 15-minute treatment showed depths of 29 microns and 40 microns and maximum compressive stresses of 14,000 ps.i. and 18,000 p.s.i. for glasses Nos. 7 and 8, respectively.

It is to be noted that it took 4 times as long for glass No. 7 to provide a compressive stress surface layer of 40 microns. Glass No. 8 after 1 hour had a greater depth, a higher compressive stress and thus a substantially higher flexural strength. Glass No. 8 treated 4 hours at 1050° F. had a layer depth of 100 microns with compressive stress of 35,000 p.s.i.

The data obtained by the treatment at 1050° F. should not be used to imply the same difference in flexural strength when a lower temperature of treatment is used for either of these two periods of time. For example, at 850° F. the potassium nitrate treatment of glasses Nos. 7 and 8 for 15 minutes provides a surface layer of the same depth, namely, 8 microns and the same maximum compressive stress of 10,000 p.s.i. For a one-hour treatment at 850° F. the depths were 17 microns and 13 microns and the maximum compressive stresses were 24,000 p.s.i. and 23,000 p.s.i. for glasses Nos. 7 and 8, respectively. Even though the depth for glass No 8 in that 1-hour treatment was 4 microns less than that of glass No. 7, such difference is relatively minor. Thus in view of the fact that the maximum compressive stress values were about the same, the unabraded flexural strengths would be about the same.

Because of the higher compressive stress value of 28,000 p.s.i. for glass No. 8 and its very substantial depth of 63 microns versus for glass No. 7 a depth of 40 microns and a stress of only 16,000 p.s.i. after the 1-hour treatment at 1050° F., glass No. 7 would not retain most of its increase in flexural strength, when severely abraded as described above, whereas glass No. 8 would maintain most of its increased strength.

A comparison of the compositions show the significant difference in oxides is the approximate 50% higher $Na_2O$ content (9.1% of glass No. 8 versus 6.3% of glass No. 7). Admittedly the $Al_2O_3$ content is lower for glass No. 7, but not significantly lower in view of the prior art teaching described above that no significant difference in ion exchangeability between these two compositions is attributable to the relatively small difference in $Al_2O_3$ content.

FIG. 3 of the Nordberg et al. article, mentioned above also shows the improved increase of flexural strength obtainable by using a higher $Na_2O$ content in the glass with low, medium or high $Al_2O_3$ content. The strengths reported are essentially unabraded values, because 150-grit abrasion merely provides a mild scratching to obtain greater uniformity between strengths of the same glass, as is now well known. The glass with 5% by weight of $Al_2O_3$ and 20% $Na_2O$ has merely double the strength of the same glass except only 10% $Na_2O$ after the potassium-for-sodium exchange. Of course, neither calcia nor magnesia was present, but such merely affects, if at all, the magnitude of the increase and then only by calcia in concentrations greater than 5% by weight.

The foregoing data show the improved flexural strength obtainable by such forehearth incorporation of sodium-containing material. Of course, as in the case of $Li_2O$ incorporation by forehearth addition, soda ash would not be used alone and preferably not at all. Instead more suitable sodium-containing material would be added at the forehearth to the glass. For example, a sodium silicate glass, that containing about 40% by weight of $Na_2O$ and the balance, i.e., 60% by weight of $SiO_2$, and that has a liquidus temperature of about 1100° C., can be added in pulverulent form or preferably in molten condition. Another suitable forehearth additive is soda.

In the process of the present invention, one of the steps is an ion-exchange treatment to replace alkali metal ion in the glass by the next adjacent larger alkali metal ion. Thus sodium ions replace lithium ions and in other glasses potassium ions replace sodium ions.

Alkali metal ions have different ionic diameters as can be seen on page 900 of the 3rd edition of Van Nostrand's Scientific Encyclopedia, published in 1958 by D. Van Nostrand Co., Inc., Princeton, N.J. The lithium ion has the smallest ionic diameter. The ionic diameters of the other alkali metal ions are in the order: sodium, potassium, rubidium and cesium, with cesium having the largest ionic diameter.

E. F. Grubb and A. W. LaDue in their copending U.S. patent application Ser. No. 529,215, filed on Feb. 23, 1966, and entitled "Process and Product" with common assignee, discloses and claims another ion-exchange method in which the alkali metal ion, that is to substitute for another alkali metal ion in the surface layer of the glass article, is used as a compound that is not molten when in contact with the glass at the elevated temperature used for the ion exchange. For example, potassium carbonate as a saturated aqueous solution is applied to a surface of a hot soda-lime-silica glass article and upon evaporation of the water content a substantially continuous layer of potassium carbonate on the glass surface is obtained. The coated glass article is then maintained at an elevated temperature for the ion exchange and then the article is cooled. The potassium carbonate coating is removed at some time after the ion-exchange treating step. The elevated temperature may be above the strain point and even as high as 50° F. above the annealing temperature but in such cases the time of treatment is shorter to avoid substantial stress relaxation. Such process can be useful to replace lithium ions in glass using sodium carbonate that is solid at the temperature of the ion exchange.

The following illustrates the use of the Grubb and La Due ion-exchange process as presented in their application. Of course, in the first embodiment of the present process, the glass would be modified by incorporation of $Li_2O$ in the batch or at the forehearth. Furthermore, instead of potassium carbonate, sodium carbonate would be used. When the modification of the glass is by the incorporation of additional $Na_2O$ content through the forehearth addition of suitable sodium-containing material, potassium carbonate would be used.

One-way beer bottles, that were made of a conventional flint container glass are referred to by assignee as GB–2000 bottles, were sprayed with aqueous salt solutions immediately after the formation of these bottles and thus prior to their annealing. The bottles at the place of spraying would be at temperatures between about 600° F. and about 900° F., as previously determined. The temperature of bottles at the spraying locations varied in temperature study because they were from different molds of an IS machine and were different styles of bottles.

Some bottles were sprayed on their outside surface with an aqueous solution of potassium carbonate. Some were sprayed on their outside surface with an aqueous solution containing two salts using 80 mole percent potassium carbonate and 20 mole percent potassium chloride. These solutions were prepared by heating water to boiling temperature and adding salt or mixture of salts to dissolve as much salt as possible. The aqueous solution was cooled to room temperature to provide saturated solutions in the presence of solid salt. The hot, newly-formed bottles after being sprayed with these saturated salt solutions, were immediately run through the annealing lehr to receive the normal annealing-temperature treatment that unsprayed bottles receive in their manufacture.

A temperature profile in a normal annealing lehr has been determined using a traveling thermocouple attached to the bottom of a bottle. This temperature profile determination indicates that for about the last one-half of the initial 5 minutes the temperature of the bottom of the bottle was rising from about 980° F. and then in the next 5 minutes the bottom of the bottle was at a temperature between 1000° F. and 1025 F°. After the first 10 minutes the temperature decreases. At the end of about 15 minutes overall, the temperature was reduced to 900° F. and at the end of 20 minutes overall it was reduced to about 600° F. followed by still further cooling. The total travel time through the lehr is about 40 minutes. The temperature in the sidewall portion of the bottle passing through the lehr will be ahead of the temperature of the bottom during the heat-up period and will retain that temperature of the bottom during the cooling period.

The glass of these bottles has an annealing point of 1033° F. and a strain point of 986° F. This glass has the following theoretical composition, expressed as oxides in weight percent.

| | |
|---|---|
| $SiO_2$ | 72.0 |
| $Al_2O_3$ | 1.9 |
| CaO | 9.6 |
| MgO | 4.2 |
| $Na_2O$ | 11.5 |
| $K_2O$ | 0.4 |

This is a conventional soda-lime-silica container glass. Its manufacture is described in many places in the literature including E. B. Shand's book mentioned above as well as "Handbook of Glass Manufacture" by Tooley published in 1953. A typical batch composition for this glass is as follows on a weight percent basis:

| | |
|---|---|
| Sand | 57.1 |
| Soda ash | 15.8 |
| High calcite lime | 5.9 |
| Raw dolomite | 14.6 |
| Nepheline syenite | 6.1 |
| Salt cake | 0.5 |

The bottles after exiting from the annealing lehr and cooling to room temperature were washed with dilute nitric acid. An examination of the bottles indicated that they had on their outer surface a 15-micron depth of surface compressive stress layer.

Part of the bottles from each type of spray-and-heat treatment were subjected to 10 minutes of abuse with a CLS Abuser. These and the other ion-exchange bottles that were not subjected to abuse were tested for shoulder impact strength. Bottles of the same type, but that had been through the annealing lehr and had not been sprayed with aqueous salt solution, were tested also for shoulder impact strength. Some of these untreated bottles were abused by the CLS Abuser for 10 minutes prior to testing for impact strength. The degree of pendulum drop increases with increase in shoulder impact strength. The following tabulates the data for shoulder impact strength of the one-way beer bottles untreated and those sprayed with two different salt solutions and heat treated, all without abuse. The other values are the strengths on other bottles of these groups after the 10-minute abuse.

|  | Untreated | $K_2CO_3$ | $4K_2CO_3/KCl$ |
|---|---|---|---|
| No abuse | 79° | 67° | 49° |
| Abused | 44° | 63° | 52° |

The foregoing data show clearly the increase of strength obtained by the alkali metal salt treatment at the elevated temperature and its substantial retention after a greater amount of abuse than the bottles would be expected to receive. The data also show the advantages of using potassium carbonate alone as compared with the specific mixture of it and potassium chloride as the alkali metal salt layer on the glass during the elevated temperature treatment.

The CLS Abuser is a machine that simulates the type of abuse received by bottles when they are fed to and taken away from the filling station in a plant where they are filled with products. This machine is known as the Consumer Line Simulator, also referred to as the CLS Abuser, and is described in report No. 62–127 of Dec. 13, 1962, issued by American Glass Research, Inc., Butler, Pa. Abuse for one minute using this device is supposed to be equivalent to the amount of abuse that glass containers receive in one year of service. Of course, this refers to returnable bottles which go through the product filling station a number of times within a year.

The abraded flexural strength values have been based on a severe abrasion using No. 30 silicon carbide grit with tumbling. This can substantially reduce or eliminate the increase of flexural strength afforded by ion exchange. It is believed that this type of abrasion is much too severe for the evaluation of ion-exchange strengthening of glass that is to be utilized in the form of certain products, such as glass containers, that will not be subjected in service to this severity of abrasion. With such severe abrasion it is necessary that the depth of the compressive stress layer be at least about 50 microns. However for certain products, such as glass containers, a depth of compressive stress layer of at least about 10 microns is sufficient to retain a substantial degree of increase of strength, afforded by the ion-exchange treatment, during the use and reuse of such products for a reasonable period of time.

Reference has been made to flexural strength and values have been given. The flexural strengths or modulus of rupture values were determined using a Tinius-Olsen testing machine. This machine applies a measured load through a single knife edge to the center of the sample rod supported on two knife edges (3-point loading). The load is applied at a constant rate of 24 pounds per minute until failure occurs, with a marker indicating the highest load applied to the point of failure. A dial micrometer calibrated in inches and equipped with a bar contact instead of a point contact is used to measure the maximum and minimum diameters at the center of the sample to an accuracy of 0.0005 inch. Since few cane samples are prefectly round, the load is applied normal to the maximum diameter and the standard formula for an elliptical cross-section is used in calculating the modulus of rupture (MR) as follows:

$$MR = \frac{\text{Load (lbs.)} \times 8 \times \text{span (in.)}}{(D_1^2 \times D_2)\pi}$$

The modulus of rupture in this formula gives the flexural strength in pounds per square inch of cross sectional area at failure.

The foregoing description of the present invention has referred to various copending U.S. patent applications having common assignee. Their disclosures are hereby incorporated by reference.

Various terms, including "strain point" and "annealing point" have been used in this description. The definitions of these terms are well-known in the art and in the published literature.

I claim:

1. In a process for manufacturing a glass article which comprises melting and fining a mixture of glass batch materials having a composition expressed as oxides on a weight percent basis, about 43% to 75% $SiO_2$, 0.1% to 25% $Al_2O_3$, 5% to 30% CaO, 0% to 20% MgO, 3.5% to 20% $Na_2O$, 0% to 5% $K_2O$, 0% to 5% BaO, 0% to 5% $B_2O_3$, said CaO and MgO expressed as CaO being 8% to 30%, said $Na_2O$ and $K_2O$ expressed as $Na_2O$ being 5% to 20% and said oxides constituting at least 90% of the glass, flowing the molten glass to an article-forming station, and forming a shaped article from the flowed glass at said station;

the improvement comprising
during passage through a forehearth zone and prior to forming the shaped article, incorporating into said glass composition, an additive material containing alkali metal oxide selected from the group of $Li_2O$ and $Na_2O$
(a) when the incorporated alkali metal oxide is $Na_2O$, the molten glass prior to incorporation containing less than about 15% $Na_2O$,
(b) when the incorporated alkali metal oxide is an $Li_2O$-containing additive material and said additive material contains any oxides other than $Li_2O$, which are already in the batch, the concentrations of such oxides added will not exceed those of the final glass composition,
(c) said material being added containing alkali metal oxide to provide the modified glass with said alkali metal oxide in a concentration that exceeds that in the unmodified glass and from about 1% to about 5% by weight when the incorporated alkali metal oxide is $Li_2O$, and from about 1% to about 6.5% by weight when the alkali metal oxide is $Na_2O$,
contacting the shaped article at a temperature in the range 200° C. to less than the strain point temperature of the glass and for a time in the range 5 minutes–24 hours, with an ion exchange medium selected from sodium and potassium ion exchange media, to effect one of
(a) sodium ion migration out of the surface of the article and potassium ion migration into the surface of the article
(b) lithium ion migration out of the surface of the article and sodium ion migration into the surface of the article
to provide a compressive stress surface layer and higher flexural strength,
and removing the article from contact with the ion exchange medium and cooling to room temperature.

2. The process of claim 1 wherein the ion exchange medium is sodium nitrate, and the modified glass contains on a weight basis about 72.3% $SiO_2$, 2.2% $Al_2O_3$, 3.8% MgO, 2.0% Li$_2$O, 9.9% Na$_2$O and 9.5% CaO and the ion exchange treatment is for 4 hours at about 750° F.

3. The process of claim 1 wherein the ion exchange medium is sodium nitrate, and the modified glass contains on a weight basis about 55.6% SiO$_2$, 15.5% Al$_2$O$_3$, 8.2% MgO, 3.0% Li$_2$O, 5.4% Na$_2$O and 11.8% CaO and the ion exchange treatment is for 4 hours at about 750° F.

References Cited

UNITED STATES PATENTS

| | | | |
|---|---|---|---|
| 2,779,136 | 1/1957 | Hood et al. | 65—30 |
| 3,287,200 | 11/1966 | Hess et al. | 161—1 |
| 3,287,201 | 11/1966 | Chisholm et al. | 161—1 |

FOREIGN PATENTS

65/2352  2/1922  Republic of South Africa.

OTHER REFERENCES

Kistler, S. S.: "Stresses in Glass Produced by Non-Uniform Exchange of Monovalent Ions," J. of Am. Ceram. Society, vol. 45, No. 2, February 1962, pp. 59–68.

S. LEON BASHORE, Primary Examiner

JOHN H. HARMAN, Assistant Examiner

U.S. Cl. X.R.

106—52